Oct. 1, 1963    J. LÜSCHER    3,105,930
SYSTEM OF VOLTAGE AND CURRENT REGULATION FOR ROTARY GENERATORS
Filed March 22, 1961

INVENTOR
JAKOB LÜSCHER
BY
ATTORNEY

United States Patent Office 3,105,930
Patented Oct. 1, 1963

3,105,930
SYSTEM OF VOLTAGE AND CURRENT REGULATION FOR ROTARY GENERATORS
Jakob Lüscher, Geneva, Switzerland, assignor to Robert Bosch G.m.b.H., Stuttgart, Germany
Filed Mar. 22, 1961, Ser. No. 97,512
12 Claims. (Cl. 322—25)

This application is a continuation-in-part of application Serial No. 732,601, filed May 2, 1958, entitled System of Voltage Regulation for Rotary Generators, now Patent No. 3,005,146.

The present invention relates to improvements in the regulation of the terminal voltage and load current of rotary electrical generators, more particularly generators driven by prime movers subject to substantial variations of operating speed and/or load current, such as those used in connection with the internal combustion engines of automotive vehicles, wind-driven generators and the like electrical power supply systems.

An important object of the invention is the provision of an improved regulating system of this type by which the generator terminal voltage may be maintained at a predetermined substantially constant value independently of relatively large variations of the speed of the prime mover driving the generator, as well as of the load imposed upon the generator during operation.

Another object of the invention is the provision of means to substantially reduce the magnetic excitation of a generator of this type in an effort to protect the generator, if the load current exceeds a predetermined safe limit value.

The improved results and effects of the invention are of special advantage for generators driven by an internal combustion engine and cooperating with a storage battery to supply a substantial and widely varying load current, as is customary in electrical power supply devices for automotive vehicles and the like systems. In such a case, it is necessary that the electrical energy supplied by the battery be restored readily by recharging of the battery by the generator upon reaching a predetermined or normal operating speed of the vehicle. This requirement is practically fulfilled by a voltage regulator capable of maintaining the terminal voltage of the generator at a constant value within a wide range of operating conditions, including the case of maximum load current comprised by both the battery charging current and the current energizing the consuming devices, such as head lights, radio, electric window lifts and other power assists or auxiliary devices.

Accordingly, a more specific object of the invention is the provision of a terminal voltage regulator for a generator of the type mentioned cooperating with a storage battery, whereby the terminal voltage of the generator is maintained at the desired or normal value throughout relatively widely varying operating conditions, including the condition of maximum load current of the generator.

Although the invention is primarily adapted for the use of semiconductor devices, such as transistors, diodes, etc., serving as variable impedance devices or control elements, other electrical devices having similar equivalent operating characteristics or parameters may be used for the carrying into effect of the invention, as will become apparent from the following.

The invention, both as to its ancillary objects and novel aspects, will be better understood from the following detailed description taken in conjunction with the accompanying drawing, forming part of this specification and wherein.

Figure 1:
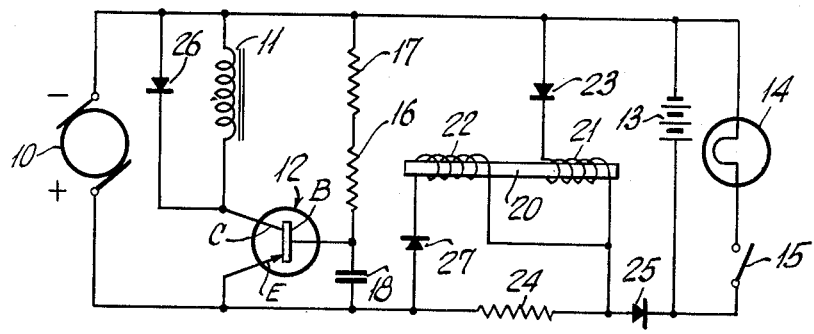
FIG. 1 is a circuit diagram of the improved regulator system for a rotary electrical generator embodying the principles of the invention and utilizing a transistor amplifier, a breakdown diode and a magnetically controlled resistor for effecting both a voltage and current control of the generator.

With the foregoing objects in view, the invention involves generally the utilization of an amplifier, preferably, though not limitatively, a semiconductor or transistor amplifier, having its output path connected in series with the field winding of a shunt-wound electrical generator, to act as a variable impedance responsive to a varying input control potential or current applied to the amplifier. The latter is controlled by a first potential or current derived from and varying in proportion to the terminal voltage of the generator, a breakdown diode serving as a reference voltage or stabilizing device being provided in the amplifier control circuit, to cause the voltage regulation to be effective in maintaining a desired generator terminal voltage by control of the field exciting current in dependance upon variations of both the generator operating speed and load current. The amplifier is further controlled by a second control potential or current derived from a varying voltage drop produced by a resistor included in series with the load circuit, to additionally control the field excitation current in a manner as to render the generator ineffective upon the occurrence of a predetermined safe maximum load current, to thereby protect the generator from excess loads, in the manner of the known current control relays used in connection with conventional generator regulators in motor cars.

The transistor amplifier may be operated continuously, known as small signal operation, or intermittently, known as large signal operation, according to an improved feature of the invention. In the latter case, the amplifier may be designed and/or adjusted to operate as a self-running relaxation oscillator, to cause the field exciting current to be periodically varied or interrupted or to provide a series of exciting current pulses or fluctuations about a mean or average excitation value. While in the case of continuous operation of the amplifier, the field current of the generator is varied in amplitude depending upon the operating conditions of the engine (speed, load current), the control in the case of intermittent operation may be by the single or combined effects of amplitude, width and repetition frequency of the current pulses or fluctuations, in such a manner as to vary the average field excitation current of the generator and to maintain a constant terminal voltage, independently of the generator speed and/or load current changes. The intermittent operation of the transistor or the like amplifier has the advantage of a more ready response of the regulation, as well as reduced losses and increased peak power, whereby to result in greater efficiency and economy of the regulation and, in turn, in reduced costs and other advantages obvious to those skilled in the art.

More specifically, use is made according to the present invention of a magnetically controlled resistor to vary the amplifier output current in dependence upon both the terminal voltage and load current variations, in such a manner as to effect a combined voltage and current regulation. This magnetoresistor, which may be of the type known as a Hall conductor, is provided for this purpose with two magnetic control windings one of which is energized by a current proportional to the terminal voltage of the generator, while the other winding is energized by a current proportional to the load current of the generator, to thereby effect a combined variation of the resistance and to, in turn, control the amplifier for both voltage and current regulation, respectively.

The control winding of the magneto or Hall resistor carrying the current proportional to terminal voltage changes includes a suitable reference voltage device, preferably in the form of a Zener or breakdown diode, to stabilize the regulation and to maintain the terminal voltage at a desired constant value determined by the critical or diode breakdown voltage. In a like manner, the magnet winding carrying the current proportional to the load of the generator may contain a forward biased regulator diode, a Zener diode or an equivalent control device or non-linear impedance, whereby to limit the current control to load currents exceeding a predetermined safe excess load of the generator.

Referring to the drawing, there is shown a shunt-wound electrical generator of conventional design having an armature 10 and a field winding 11 and producing a voltage as indicated by the plus and minus signs. Connected in series with the field winding 11 is the emitter-collector path E-C of a semiconductor triode or transistor amplifier 12, such as a known PNP junction transistor having an emitter E, a base B and a collector electrode C. The transistor shown is operated in the common emitter configuration, that is, with the emitter E connected to the plus pole and with the collector C connected to the minus pole of the generator and with the control potential being applied between the base B and emitter E. Connected in parallel to the generator G in a known manner are a storage battery 13 and a load circuit. The latter may include one or more consuming devices, as indicated by the lamp 14 connectable through a control switch 15.

In the known regulator systems for generators driven by the internal combustion engines of automotive vehicles and the like, it is customary to provide a voltage regulator relay designed to control the field current of the generator and being excited by a current proportional to the terminal voltage, to maintain the latter at a desired constant value independently of speed and load current changes, a current regulator relay excited by a current proportional to the load current supplied by the generator and designed to materially reduce or interrupt the field exciting current to a safe value upon the occurrence of a predetermined excess load of the generator, and finally a reverse current relay designed to prevent a current flow from the battery into the generator upon the generator terminal voltage decreasing below the battery voltage or normal operating terminal voltage of the generator. According to the present invention, the functions of the voltage and current relays are performed by the transistor amplifier in conjunction with a dual control magnetoresistor 16 connected in the input or emitter-base circuit of the amplifier and varied in response to both terminal voltage and load current changes of the generator, respectively. For this purpose, the magnetoresistor 16, which may be in the form of a well-known Hall conductor, is shown connected between the base B and the minus terminal of the generator in series with a further fixed biasing resistor 17, to control the base-emitter current of the transistor. A capacitor 18 may be shunted across the base-emitter path for the purpose to be described further hereafter.

The electrical resistance of the magneto or Hall conductor 16 is controlled in a known manner by a variable magnetic field produced by a magnet core 20 by means of a pair of separate magnetic control windings 21 and 22. Winding 21 serving to effect the voltage control of the generator is connected to one generator terminal, that is, the minus terminal in the example shown, through a reversely biased reference or breakdown (Zener) diode 23, on the one hand, and to the far side of a resistor 24 connected to the opposite (plus) generator terminal in series with the load circuit comprising the battery 13 and consuming devices 14, on the other hand.

The breakdown diode 23 consists in a known manner of a reversely biased PN junction rectifier which has a relatively high impedance over a predetermined range of reverse bias voltage until reaching the critical or avalanche breakdown voltage of the device, causing a sudden change from said high impedance to relatively low impedance, in a manner analogous to the action of other known step-function impedance devices or switches, such as a gaseous voltage regulator tube. In other words, the function of the diode 23 may be compared with a switch closing the circuit of winding 21 upon the generator terminal voltage increasing beyond the critical or breakdown voltage and re-opening the circuit upon decrease of the applied voltage below the critical voltage of the breakdown diode.

Figure 2:
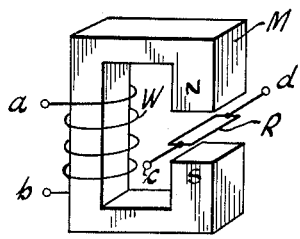
FIG. 2 illustrates in greater detail the construction of the magnetic control resistor forming part of FIG. 1.
Figure 3:
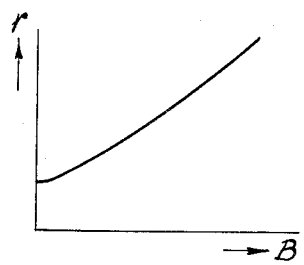
FIGS. 3 and 4 are theoretical curves illustrative of the function and operation of the invention.

FIG. 2 illustrates by way of example the conventional construction of the Hall conductor or magnetoresistor, comprising a U-shaped magnet core M having poles N and S, a control winding W mounted upon said core and a strip R of a suitable semiconductive material having Hall resistance characteristics and being mounted within the air gap between the poles N and S. The resistance strip R may consist in a known manner of indium-arsenide, indium-antimonide or an equivalent material possessing magnetoresistive properties, the surface of the strip being arranged substantially normal to the direction of the magnetic field between the poles N and S. In a device of this type, the electrical resistance $r$ of the strip R provided with connecting terminals $c$ and $d$ varies as a function of the magnetic field or magnetic induction B in the manner shown by the plot of FIG. 3, that is, an increase of the field strength determined by the current through the winding W, applied through connecting terminals $a$ and $d$, results in a proportional increase of the resistance of the strip or Hall conductor, and vice versa, in the manner well known in the art.

In the following, there will be described the operation and function of the voltage regulator system shown in FIG. 1. Assuming the generator speed to increase from zero to a value exceeding the critical or breakdown voltage of the diode 23, a current flow will be set up through the control winding 21 of the magnetoresistor 16, resulting in an increase of magnetic field strength and, in turn, of the resistance according to FIG. 3. As a consequence, the base-emitter current of the transistor 12 is decreased, resulting in a decrease of the output or collector current flowing through the field exciting winding 11 and, in turn, of the voltage generated in the armature 10. As a result, the generator terminal voltage is caused to fluctuate about a value determined by the critical or breakdown value of the Zener diode 23, such as to maintain a substantially constant, assigned generator terminal voltage, independently of changes of both generator speed and load current within relatively wide limit values. For speeds below the critical value, the battery 13 serves as a supply source for the load current with the further diode 25 interposed between the generator and the battery serving to prevent a current flow from the battery into the generator, in a manner analogous to the action of the conventional reverse current relay provided in automotive and the like generator control devices.

The breakdown diode 23 and magnetoresistor 16 are accordingly effective in compensating terminal voltage changes in the manner described and resulting from both generator speed as well as load current variations. In the latter case, an increase of the load current will result in a decrease of the terminal voltage due to the increased armature voltage drop of the generator. This, in turn, will result in a reduced exciting current through the control winding 21 followed by a decrease of the resistance 16 and, in turn, an increased collector and field exciting current through winding 11, in such a manner as to compensate for the decrease of the terminal voltage. In other words, an increase of a load current results in an increase of the exciting current through the field winding 11, and vice versa, in a manner to restore and maintain the terminal voltage at the desired operating value.

A further diode 26 shunting the field winding 11 in the reverse current or blocking direction serves to protect the transistor from inductive voltage transients as well as to improve the operation if the transistor is operated as an oscillator, in the manner described in further detail hereafter.

In order to effect a current control of the generator 10, to protect it from excess load current, there is provided in accordance with the invention a second control winding 22 of the magnetoresistor 16 being connected across the auxiliary load resistor 24 in series with a further forwardly biased diode 27 which serves to control the current flow through the winding 22. More particularly, the control of the winding 22, or the effect on the field exciting current through the winding 11, is opposite to the control or effect on the field current resulting from terminal voltage changes being compensated through the action of the control winding 21, in the manner described hereinbefore.

More specifically, an increase of the load current, resulting in an increased voltage drop through the series resistor 24, causes a greater magnetic field strength or induction B and, in turn, an increase of the resistance 16. The latter results in a decrease of the base current of the transistor, and, in turn, in a decreased collector current or exciting current through winding 11.

In other words, while the voltage control through the winding 21 results in an increased field or generator exciting current with increasing load, and vice versa, the current control through winding 22 results in a decreased field or generator exciting current with increasing load current of the generator, that is, the controls by windings 21 and 22 resulting from load current changes, function in an opposite sense in their effect upon the generator field or exciting current through winding 11.

Figure 4:
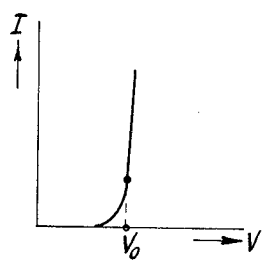

However, for normal load conditions, the control through winding 22 is rendered ineffective by the action of the diode 27 in conjunction with the load resistor 24, to prevent any substantial current flow in the control circuit until after the load current increases beyond a predetermined and safe excess value. There may be utilized for this purpose a conventional forward biased diode 27, preferably a silicon diode, having a current-voltage characteristic I-V, FIG. 4, exhibiting substantially zero current or high impedance up to certain critical voltage $V_0$, determined by the barrier potential of the diode, and becoming conductive beyond said critical voltage, in the manner shown and well known. By so designing the resistor 24, having practically a value of the order of less than one ohm, as to result in the required biasing voltage drop $V_0$ for the diode 27, upon the occurrence of a desired excess load current of the generator, the result will be a sudden substantial current flow through the winding 22 and, in turn, a corresponding decrease of the field current through winding 11, such as to practically interrupt or to render ineffective the generator and to protect it from the excess load.

In place of forward biased diode 27, a breakdown diode may be provided having a critical or Zener voltage suitably related to the series resistor 24, to result in the desired excess current control, in a substantially analogous manner as described and understood from the foregoing.

In contrast to the operation involving a continuous or proportional control of the field exciting current through the winding 11, it is possible according to the invention to utilize a periodically interrupted or fluctuating field exciting current by operation of the transistor or equivalent amplifier as a relaxation oscillator, that is, by causing the emitter-collector output path of the amplifier connected in series with the field winding 11 to vary periodically between a condition of relatively high impedance and a relatively low impedance, respectively (large signal operation). In this case, control of the field current may be effected by variation of the initiation of the oscillating pulses in response to changes of the generator terminal voltage and/or load current, in such a manner as to result in a variation of the amplitude and/or width, or the recurrence frequency of the fluctuations or current pulses. This, in turn, results in the control of the average or mean field excitation current through the winding 11. The relaxation oscillations may be produced or maintained in a known manner, such as by utilizing the inductance of the field and/or armature windings of the generator, if necessary in conjunction with additional feedback and/or phase-shifting devices, as is customary in the operation of self-running relaxation oscillators.

As is well known, in the relaxation type of oscillator, the oscillation pulses are produced by causing an electric or magnetic field to be built up in a capacitance or inductance until a set of limiting conditions is reached to result in a sudden dissipation of the field until a second set of limiting conditions causes the field to build up again, and so on. In the case of the present invention, the limiting conditions may be provided by the sudden or discontinuous current change or saturation of the transistor or by the inherent non-linear impedance characteristic of the breakdown diode or equivalent impedance element.

Thus, the transistor 12 in FIG. 1 may be operated in the manner of a self-running blocking oscillator to produce sustained relaxation oscillations or pulses through the field winding 11 of the generator. For this purpose, the capacitor 18 connected to the base B and collector C may be so designed as to provide an adequate feedback action between the collector and base circuits of the transistor, to cause the maintenance of sustained relaxation oscillations. The control of the oscillations is effected by means of the magnetically controlled biasing resistor 16 connected in the base circuit in series with the fixed biasing resistor 17. Resistor 16 again takes the form of a well-known Hall conductor to vary its electric resistance in proportion to a magnetic biasing or control field, in the manner described herein.

In place of the circuit shown in the drawing, any other known circuit arrangement to produce sustained relaxation oscillations, such as a standard blocking oscillator or multivibrator, may be used for carrying into effect the invention, as will be readily understood.

In operation, as the generator terminal voltage reaches its normal or operating value, a current is caused to flow through the winding 21 and breakdown diode 23, whereby to vary the magnetic field and, in turn, the resistance of the Hall conductor 16 and to displace the operating bias of the transistor in a manner to reduce the width and/or amplitude of the relaxation oscillations or fluctuations, in such a manner as to vary the average or mean exciting current through the field winding 11. Again, the direction of the exciting currents through the control windings 21 and 22 is such as to maintain a substantially constant generator terminal voltage, on the one hand, and to reduce the field excitation or render the generator ineffective upon the occurrence of a predetermined excess load current, on the other hand, in the manner described and readily understood from the foregoing.

In the case of a continuous (small signal) operation of the transistor amplifier, the maximum admissible losses are determined by the product of the effective voltage between the emitter and the collector and the field exciting current. Assuming, as an example, a normal generator voltage of 12 volts and a maximum rated generator power of 180 watts, the field winding will be caused to carry a maximum exciting current of 2 amperes and accordingly should have a D.C. resistance not exceeding 6 ohms. On the other hand, if the generator is called upon to supply only 100 watts, the exciting current through the winding should not be more than about 6.8 amperes, in which case the voltage drop through the winding 11 would be 4.8 volts, that is, a difference of 7.6 volts remains across the emitter-collector path of the transistor, resulting in a power dissipation or loss in the transistor of 0.8×7.6 or about 6 watts.

In the operation of the transistor as an oscillator, on the other hand, the collector circuit is periodically interrupted and, since during the periods of high field excitation current (2 amperes) only a small emitter-collector voltage is required, being of the order of about 1 volt and, conversely, since during the blocking periods the transistor operates with an emitter-collector voltage of about 10 volts and carries a collector current of only about 0.3 ampere or less, the maximum dissipation or loss in the transistor in the case of intermittent operation is found to be about 3 watts only.

In the case of the operation of the transistor 12 as an oscillator in the manner described, the further purpose and function of the diode 26 is to effect a complete blocking of the transistor during the interrupting periods or intervals between the exciting current pulsations through the winding 11. During the flow of current through the transistor 12 and the winding 11, the diode 26 offers a relatively high impedance to the current, amounting to a practical open circuit compared with the relatively low resistance of the field winding. During the instants of blocking of the transistor, on the other hand, the field excitation current is prevented from instantly falling to zero due to the inductance of the field winding, whereby to result in an equalizing current through the diode 26 during the collapse of the magnetic field. This affords an instant and complete blocking of the transistor until the equalizing current through the diode has been reduced to a sufficiently low valve, to cause the terminal voltage of the generator to decrease slightly, say by about 0.1 volt, when a new relaxation pulse is started rendering the transistor again conductive and capable of carrying a current substantially in excess of the maximum equalizing current. At the start of the current through the transistor, the diode 26 against becomes non-conductive.

In the foregoing, the invention has been described in reference to a specific illustrative device and circuit. It will be evident, however, that variations and modifications, as well as the substitution of equivalent circuits and elements for those shown for illustration, may be made within the broader scope and purview of the invention as set forth in the appended claims. The specification and drawing are accordingly to be regarded in an illustrative rather than in a restrictive sense.

I claim:

1. A control system for a shunt-wound electrical generator having an armature winding and a field excitation winding and a load circuit connected thereto, said generator being subject to variations of both the voltage generated and load current in said circuit, said system comprising an amplifier having an input control circuit and an output path connected in series with said field winding, a magnetically controlled resistor in said input circuit, having a resistance increasing in proportion to the strength of a biasing magnetic field controlling the same, a first magnetic control winding for said resistor, a non-linear step-function impedance device having a critical voltage equal to the terminal voltage of said generator to be held constant, means to connect said control winding to said generator in series with said device such as to excite said control winding by a current proportional to the terminal voltage of said generator and having a direction such as to increase the current through said field winding upon a decrease of said terminal voltage, and vice versa, to thereby maintain a said terminal voltage at a constant value substantially equalling said critical voltage, and a second magnetic control winding for said resistor and means to pass therethrough a current proportional to said load current and having a direction, to decrease the field exciting current upon increase of said load current, and a further non-linear impedance device in series with said second control winding adapted to prevent a current flow therethrough for load currents below a predetermined limit value and to cause an appreciable current through said second control winding and reduction of the field exciting current upon the occurrence of a load current exceeding said limit value.

2. In a control system as claimed in claim 1, said first non-linear impedance device consisting of a reversely biased breakdown junction diode having a critical breakdown voltage substantially equal to the assigned terminal voltage of said generator.

3. In a control system as claimed in claim 1, a storage battery having a voltage equal to said generator terminal voltage and connected to said generator and load circuit, said first non-linear impedance device consisting of a reversely biased breakdown junction diode having a critical breakdown voltage equal to said terminal voltage.

4. In a control system as claimed in claim 1, including a storage battery having a voltage equal to the generator operating terminal voltage and connected in parallel to said generator and load circuit, said first non-linear impedance device consisting of a reversely biased breakdown junction diode having a breakdown voltage equal to said terminal voltage, and a unidirectional conducting device connected in series with said generator and battery, to prevent reverse current flow from said battery to said generator.

5. In a control system as claimed in claim 1, said further non-linear impedance device consisting of a forwardly biased junction diode.

6. In a control system as claimed in claim 1, including means to operate said amplifier as a self-running oscillator, to cause periodic fluctuations of the field exciting current having an average value controlled by said resistor.

7. A control system for a shunt-wound electrical generator having an armature winding and a field excitation winding and a load circuit connected thereto, said generator being subject to variations of both the voltage generated and load current through said circuit, said system comprising a transistor amplifier having a base input circuit and an emitter-collector output path connected in series with said field winding, a magnetically controlled resistor in said input circuit having a resistance increasing in proportion to the strength of a biasing magnetic field controlling the same, first magnetic exciting means for said resistor arranged to be energized by a current proportional to the terminal voltage of said generator and having a direction such as to increase the current through said field winding upon decrease of the terminal voltage, and vice versa, a breakdown junction diode having a predetermined critical voltage in series with said exciting means, to effect a current flow through said exciting means upon said terminal voltage exceeding said critical voltage and to interrupt the current through said exciting means upon said terminal voltage decreasing below said critical voltage, to thereby maintain the terminal voltage of said generator at a constant value equal to said critical voltage, second magnetic exciting means for said resistor independent of said first exciting means and arranged to be energized by a current proportional to said load current and having a direction such as to decrease the current through said field winding upon increase of said load current, and a non-linear impedance device in series with said second exciting means, to prevent a current flow therethrough for load currents below a predetermined limit value and to cause an appreciable current through said second control means and reduction of the field exciting current of said generator upon the occurrence of a load current exceeding said limit value.

8. In a control system as claimed in claim 7, said second exciting means including a fixed resistor in series with said load circuit and said non-linear impedance device consisting of a forwardly biased junction diode in series with said fixed resistor and second exciting means.

9. In a control system as claimed in claim 7, including means to operate said amplifier as a self-running relaxation oscillator, to cause periodic fluctuations of the generator exciting current having an average value controlled by said resistor.

10. A control system for a shunt-wound electrical generator having an armature winding, a field excitation winding and a load circuit connected thereto, said generator being subject to substantial terminal voltage changes during operation, said system comprising a transistor amplifier having an input base circuit and an emitter-collector output path connected in series with said field winding, a magnetically controlled resistor connected in said base circuit having a resistance increasing in proportion to the strength of a biasing magnetic field controlling the same, a first magnetic control winding for said resistor connected to said generator to be excited by a current proportional to the terminal voltage of said generator and having a direction such as to increase the current through said field winding upon a decrease of the generator terminal voltage, and vice versa, a breakdown junction diode having a predetermined critical voltage in series with said control winding to effect a current flow through said control winding upon said terminal voltage exceeding said critical voltage and to interrupt the current through said control winding upon said terminal voltage decreasing below said critical voltage, whereby to maintain a constant operating terminal voltage of said generator equal to said control voltage, a fixed resistor in series with said load circuit, a forward biased junction diode, a second magnetic control winding for said first resistor being connected to said fixed resistor in series with said last-mentioned diode, to prevent a current flow through said last control winding for load currents less than a predetermined limit value and to cause a substantial current flow therethrough in a direction to reduce the magnetic field produced by said first control winding upon the load current exceeding said limit value.

11. A control system for a shunt-wound electrical generator having an armature winding, a field excitation winding, and a load circuit connected thereto, said generator being subject to substantial terminal voltage changes during operation, said system comprising an amplifier having an input circuit and an output circuit in series with said field winding, a magnetically controlled resistor in said input circuit having a resistance increasing in proportion to the strength of a magnetic biasing field controlling the same, a first magnetic control winding for said resistor with means for passing therethrough a current proportional to the terminal voltage of said generator and having a direction such as to increase the field excitation current of said generator upon a decrease of said terminal voltage, and vice versa, a second magnetic control winding for said resistor with means for passing therethrough a current proportional to the load current flowing in said circuit and having a direction such as to decrease the field excitation current of said generator upon an increase of said load current, a first step-function non-linear impedance device in series with said first control winding having a predetermined critical voltage, whereby to maintain said generator terminal voltage substantially constant at a value equal to said critical voltage, and a second step-function non-linear impedance device in series with said second control winding, to prevent a current flow through said second control winding below a limit current corresponding to a predetermined permissible maximum current in said load circuit.

12. In a control system as claimed in claim 11, wherein said first impedance consists of a reversely biased breakdown junction diode and said second impedance consists of a forward biased junction diode.

References Cited in the file of this patent
UNITED STATES PATENTS

| | | |
|---|---|---|
| 2,534,542 | Bower | Dec. 19, 1950 |
| 2,616,072 | Edwards et al. | Oct. 28, 1952 |
| 2,866,944 | Zelind | Dec. 30, 1958 |
| 2,886,763 | Zelind | May 12, 1959 |

OTHER REFERENCES

Scientific American, "Automatic Voltage Regulator," by J. Naveman, May 30, 1914, p. 449.